US008995266B2

(12) United States Patent
Clemm et al.

(10) Patent No.: US 8,995,266 B2
(45) Date of Patent: Mar. 31, 2015

(54) PERFORMING PATH-ORIENTED SYSTEMS MANAGEMENT

(75) Inventors: L. Alexander Clemm, Los Gatos, CA (US); Yuquan Jiang, Milpitas, CA (US); Aamer Akhter, Cary, NC (US); Steve Chang, Cupertino, CA (US); Shyyunn Sheran Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 12/831,877

(22) Filed: Jul. 7, 2010

(65) Prior Publication Data
US 2012/0008498 A1 Jan. 12, 2012

(51) Int. Cl.
H04J 1/16 (2006.01)
H04J 3/14 (2006.01)
H04L 12/24 (2006.01)
H04L 12/913 (2013.01)

(52) U.S. Cl.
CPC ........... *H04L 41/0213* (2013.01); *H04L 47/724* (2013.01)
USPC ........................................................ 370/235

(58) Field of Classification Search
None
See application file for complete search history.

(56) References Cited

U.S. PATENT DOCUMENTS

| | | | |
|---|---|---|---|
| 6,954,779 B2 | 10/2005 | Duggan et al. | |
| 7,646,728 B2 | 1/2010 | Fahmy | |
| 7,706,293 B2 * | 4/2010 | Wang | 370/249 |
| 2001/0038611 A1 | 11/2001 | Darcie et al. | |
| 2002/0169860 A1 | 11/2002 | Duggan | |
| 2004/0073653 A1 | 4/2004 | Hunt et al. | |
| 2005/0256669 A1 | 11/2005 | Mitsui | |
| 2006/0271677 A1 | 11/2006 | Mercier | |
| 2006/0294230 A1 | 12/2006 | Takasu | |
| 2009/0019432 A1 | 1/2009 | Kondo | |
| 2009/0164613 A1 | 6/2009 | Saillet | |
| 2010/0014439 A1 | 1/2010 | Fuhrmann et al. | |

(Continued)

FOREIGN PATENT DOCUMENTS

| | | |
|---|---|---|
| CN | 1511399 A | 7/2004 |
| CN | 1794662 A | 6/2006 |

(Continued)

OTHER PUBLICATIONS

European Patent Office, "Search Report with Written Opinion", Application No. 10196975.6-2416 Dated Jul. 11, 2011, Applicant: Cisco Systems Inc., 8 pages.

(Continued)

*Primary Examiner* — Ayaz Sheikh
*Assistant Examiner* — Blanche Wong
(74) *Attorney, Agent, or Firm* — Hickman Palermo Becker Bingham LLP

(57) ABSTRACT

A method is disclosed for transmitting system management requests to computer systems along a network path using a network control protocol, such as RSVP. For example, an originating node may send a single system management request along a path to a destination node using a network control protocol. Each computer system along the network path may analyze the network control protocol message to determine whether the message contains a system management request. If a system management request is found in the message, the computer system may perform the system management function identified in the request, and respond to it.

25 Claims, 7 Drawing Sheets

(56) References Cited

U.S. PATENT DOCUMENTS

| | | |
|---|---|---|
| 2010/0260054 A1 | 10/2010 | Habib et al. |
| 2010/0262367 A1 | 10/2010 | Riggins et al. |
| 2011/0063972 A1 | 3/2011 | Muley et al. |
| 2012/0016981 A1 | 1/2012 | Clemm |

FOREIGN PATENT DOCUMENTS

| | | |
|---|---|---|
| CN | 101047575 A | 10/2007 |
| EP | 1 675 303 A1 | 6/2006 |
| EP | 2 159 956 A1 | 3/2010 |
| EP | 2159956 A1 | 3/2010 |
| WO | WO 2009/016463 A1 | 2/2009 |

OTHER PUBLICATIONS

Takacs A. et al., "GMPLS RSVP-TE Extensions to Control Ethernet OAM draft-takacs-ccamp-rsvp-te-eth-oam-ext-01", Dated Feb. 25, 2008, 23 pages.

International Searching Authority, "International Search Report for PCT with Written Opinion", application No. PCT/US2010/054349, applicant Cisco Technology Inc., dated Mar. 2, 2011, 15 pages.

Current claims for PCT application No. PCT/US2010/054349, 3 pages.

Kamil Sarac et al., "A Distributed Approach for Monitoring Multicast Service Availability", Journal of Network and Systems Management, vol. 12, No. 3, dated Sep. 1, 2004, pp. 327-348.

Leung Y-W et al., "Lower bound for multimedia multicast routing", IEE Proceedings: Communications, Institution of Electrical Engineers., vol. 145, No. 2 Dated Apr. 16, 1998 pp. 87-90.

Subramanyan, et al., "A scalable SNMP-based distributed monitoring system for heterogeneous network computing", ACM—New York, 2000, XP0400123861, 10 pages.

State Intellectual Property Office of the People's Republic of China, "$1^{st}$ Office Action" in application No. 201010611936.X, dated Jul. 10, 2013, 17 pages.

Current Claims in application No. 201010611936.X, dated Jul. 2013, 4 pages.

State Intellectual Property Office of the People's Republic of China, "First Office Action" in application No. 201080068045.2, dated Jul. 23, 2014, 8 pages.

Claims in China Application No. 201080068045.2, dated Jul. 2014, 6 pages.

\* cited by examiner

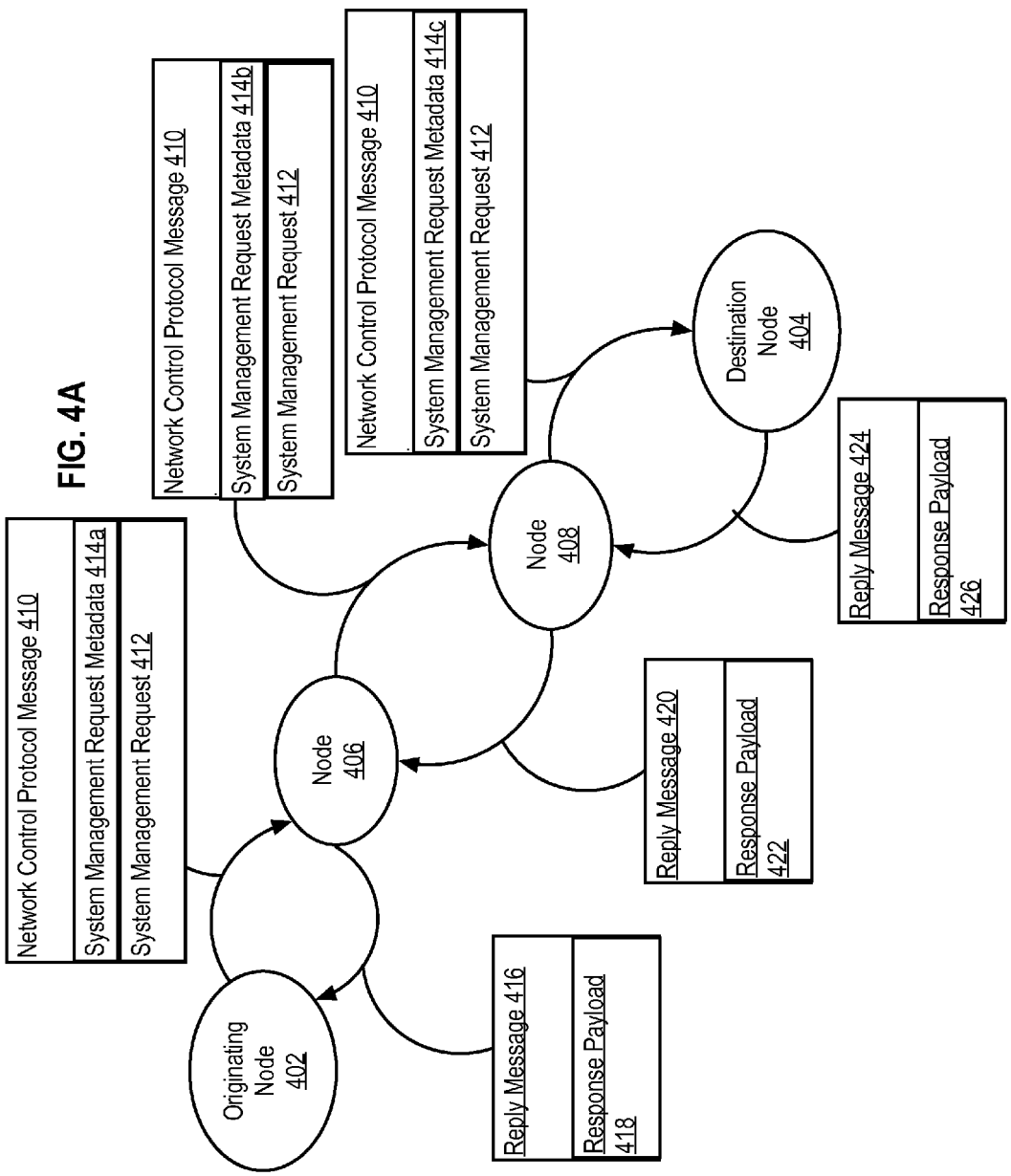

PERFORMING PATH-ORIENTED SYSTEMS MANAGEMENT

TECHNICAL FIELD

The present disclosure generally relates to network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer network management protocols enable administrators to manage network paths and allocate resources for communications between networked computers. For example, ICMP traceroute is used to discover the IP addresses of interfaces on systems along a path. Multiprotocol Label Switching (MPLS) Operations, Administration and Maintenance (OAM, MPLS-OAM) follows an MPLS label switched path (LSP) discovering systems and MPLS labels along a path. Ethernet OAM (E-OAM) is similar to MPLS-OAM for Ethernet domains. Cisco Discovery Protocol (CDP) and Link Layer Discovery Protocol (LLDP) may discover information about connected neighbors. Resource Reservation Protocol (RSVP) allows messages to traverse systems along a path for a special-purpose application that concerns reservation of resources for quality of service (QoS) purposes.

System management tasks include configuration and data collection. Performing system management tasks may require the administrator or a management application to send multiple messages to networked computers. For example, a path discovery message to a target computer may be used to determine a path to the target and multiple second, separate messages may carry a management request to each node along the path. This approach requires too many messages in the network and too much processing at the management station.

BRIEF DESCRIPTION OF THE DRAWINGS

In the drawings:

FIG. 4A illustrates management request processing along the outbound path with the response payload sent to the originating node in individual response messages according to embodiments;

DETAILED DESCRIPTION

Figure 1:
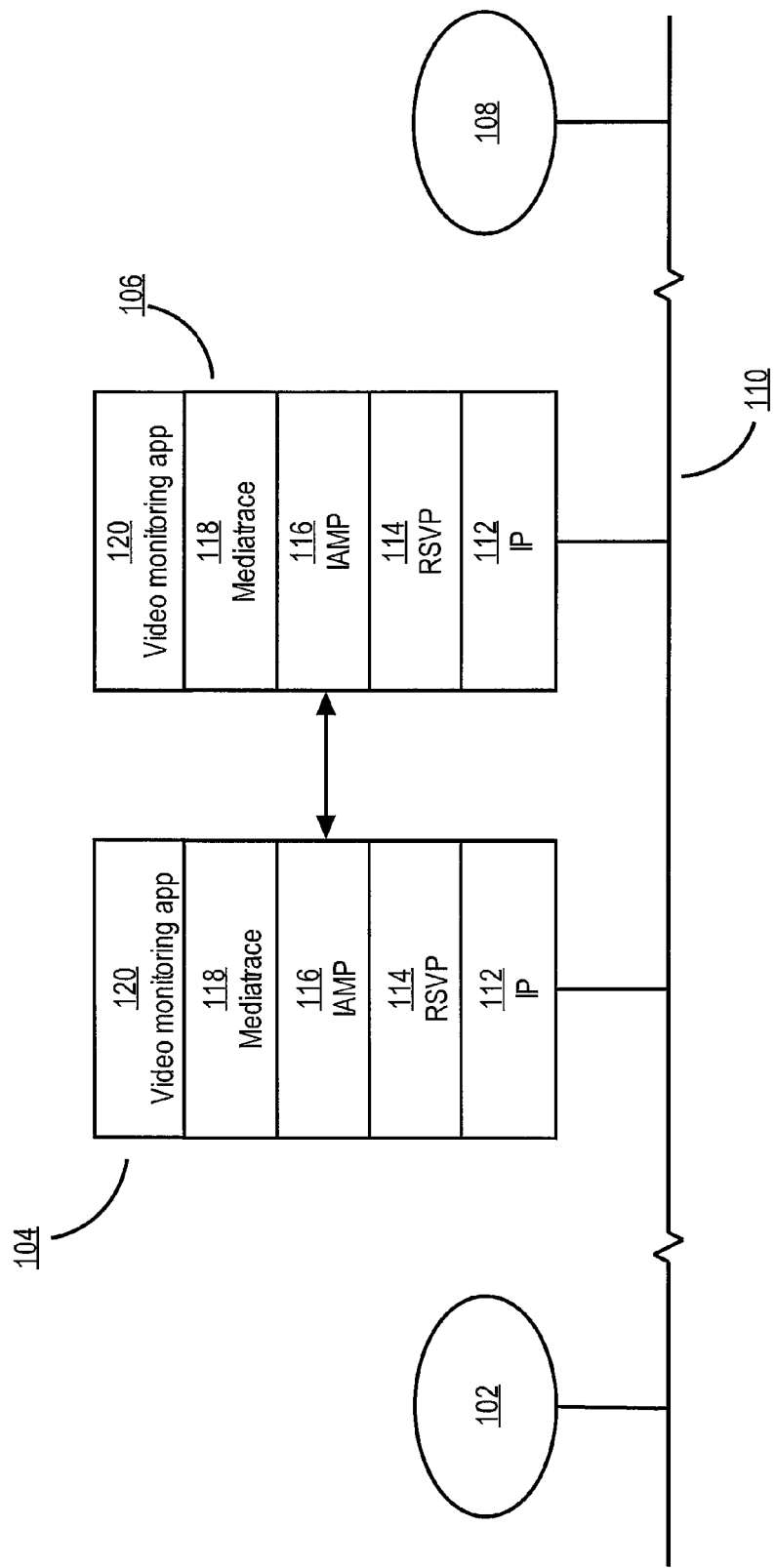
FIG. 1 illustrates a TCP/IP model.

Performing path-oriented systems management is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Path-Oriented Systems Management Approach
   3.1 Processing Outbound Messages
   3.2 Processing Inbound Messages
4.0 Implementation Mechanisms—Hardware Overview
5.0 Extensions and Alternatives 1.0 General Overview In an embodiment, a first node receives a network control message sent from an originating node to a destination node. The network control message may contain and comprise, among other data elements, a system management request and system management request metadata. The system management request may be analyzed to determine a particular system management function to perform at the first node. The network control message may be relayed to a second node. In other embodiments, the invention encompasses a computer apparatus and a computer-readable medium configured to carry out the foregoing steps.

2.0 Structural and Functional Overview

Embodiments may use path-oriented network control protocols to transport system management requests and system management request response payloads to nodes along a network path. A network control message may be a message of a control protocol that is used as a transport. For example, in an embodiment RSVP is extended in a new and unanticipated way to carry system management requests and system management request response payloads using RESV or PATH as control messages. Conventional RSVP is an application layer protocol designed to reserve resources at each node along a path between an originating node and a destination node across a network, but is not used as a transport to carry system management requests or responses. One RSVP Path message may be sent from an originating node to a destination node to reserve resources for a data flow at each intermediate node along the network path. Once the RSVP Path message reaches the destination node the destination node may transmit a RSVP RESV message back along the network path to the originating node. The RSVP RESV message may indicate to each node along the network path what resources are needed for transmitting the flow along the path.

In embodiments, instead of sending a unique management request message to each node along a network path between an originating node and a destination node, a single RSVP message services as a transport to carry the management request to all nodes along the network path. Each node may receive and relay a single RSVP message along the path. RSVP messages may also carry system management request response payloads back along the path. Therefore, overcoming problems with past approaches, a system administrator at an originating node may send a single RSVP message to transmit a system management request to multiple nodes along a network path thereby reducing traffic on the network. Further, the originating node does not need to name, address or know about the individual nodes on the path, contrary to traditional methods in which the management request is directed at a specific, named agent.

Although some embodiments disclosed herein are discussed with reference to RSVP, in other embodiments other protocols may be used to transport system management requests and system management response payloads. For example, some embodiments may use Simple Traversal of UDP through Network Address Translation (STUN) or Network Layer Signaling (NLS) protocol messages.

FIG. 1 illustrates a TCP/IP model for various embodiments. Nodes 102, 104, 106 and 108 may be connected on a network via hardware 110. Each of the nodes 102, 104, 106 is a computer that may comprise an element of network infrastructure such as a router, switch, gateway, or hub. Alternatively, nodes may be network end stations such as servers, workstations, storage, or printers.

In an embodiment, nodes 102, 104, 106 host or execute logic configured to perform communication functions and application functions organized in a plurality of conceptual or logical layers. In an embodiment, nodes 102, 104, 106 host or execute logic configured for an Internet Protocol (IP) layer 112, transport layer 114 hosting a protocol such as RSVP, an intermediate layer 116 that hosts an inter-agent management protocol (IAMP), a first application such as a Mediatrace application 118, and source of management information in which the first application 118 is interested, such as a video monitoring application 120.

Management information is conveyed from application 120 to application 118 using an inter-application communication mechanism such as IAMP. In an embodiment, TAMP conveys management requests and responses and contains metadata about a request, such as a hop count, request identifier, initiator identifier, and various flags, and the request or a response and their respective parameters. Thus IAMP messages may provide a binding between an application that is servicing requests and the underlying transport.

Network layer 112 may provide for logical addressing and routing using, for example, and IP addressing. Network layer 112 may also be responsible for datagram encapsulation, among other things. Transport layer 114 may responsible for the host-to-host transport of data. Transport layer 114 may also be responsible reliably or unreliably transporting data from host-to-host and resending data if needed.

Embodiments described herein may be implemented at layer 116 of the example TCP/IP Model of FIG. 1. Thus, embodiments may operate between the transport layer and the application layer of the TCP/IP Model. For example, at layer 116 embodiments may provide the IAMP for managing systems along a path within a network. In an embodiment, IAMP may leverage aspects of RSVP using logic that determines when to process management requests that are received, the way in which responses are sent, and when to transmit data to nodes along a network path, as disclosed further below. Thus, in an embodiment, system management commands such as data collection and configuration commands may be transported from node 104 to node 106 at layer 116 of the TCP/IP Model of FIG. 1.

Moreover, other nodes such as nodes 102, 108 that implement IAMP may be able to receive IAMP packets and perform the system management tasks contained therein. However, if nodes 102, 108 do not implement IAMP, or if no process on the nodes has registered to intercept RSVP messages containing the payloads defined herein, then the nodes may process the IAMP packet as if it were a RSVP packet and merely pass the packet on to the next node. Thus, nodes along a path may be traversed transparently and may process the IAMP packet according to RSVP. Further, if a node does not implement RSVP, the packet may be transparently passed on without interception or processing for the purposes described herein.

The first and second application layers provide high level processes that may use embodiments described herein. An example implementation of the first application layer is Mediatrace from Cisco Systems, San Jose, Calif. An application such as Mediatrace may rely on embodiments described herein to identify end-to-end problems in media streams. As another example, a video monitoring software application, at second application layer, may use Mediatrace to identify problems in video media streams.

Figure 2:
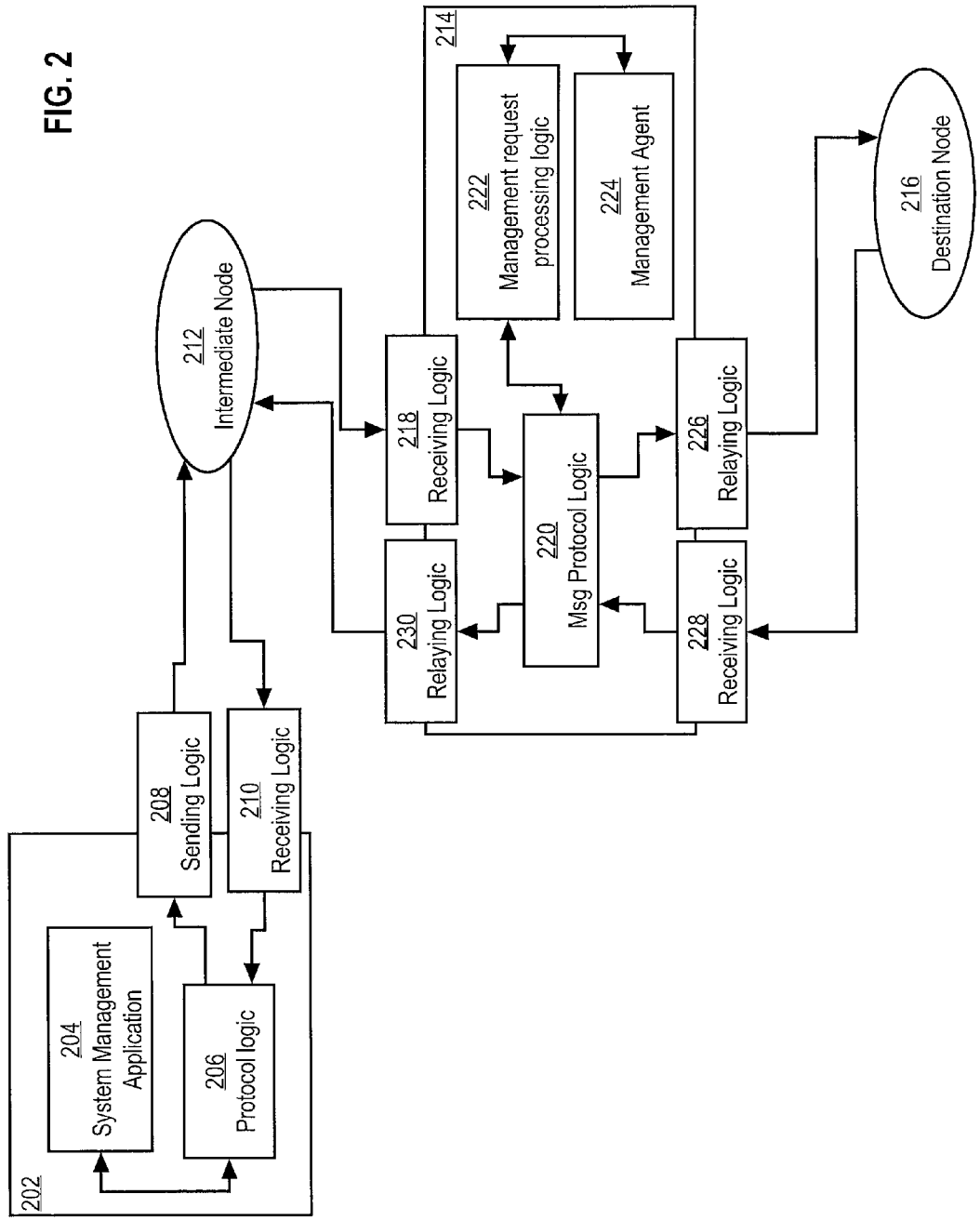
FIG. 2 illustrates a computer system that may perform path-oriented systems management.

FIG. 2 illustrates a computer system that may perform path-oriented systems management, according to embodiments. An originating node 202 may host system management application 204, protocol logic 206, message sending logic 208 and message receiving logic 210. Any computing device on a network may be an originating node. For example, originating node 202 may be an internetworking device such as a router, a switch, or gateway, or a network end station device such as a server, a personal computer or any other computing device.

System management application 204 may be a system management application used by a system administrator, or other user, to perform system management tasks on computer systems within the network, such as computer systems 202, 212, 214, 216. System management application 204 may specify a particular system management task, or multiple system management tasks, for which a system management request may be issued. The system management request may be inserted into a network control protocol message, such as a RSVP message, a STUN message, or an NLS message, for delivery to nodes along a network path.

Protocol logic 206 may be logic configured to insert system management requests received from system management application 204 into network control protocol messages, according to embodiments. System management request may be requests to configure systems along the network path by providing configuration data. Alternatively, system management requests may be requests for data collection. For example, a system administrator may wish to collect system information from all nodes along a network path. Examples of information that may be collected from nodes along a network path are host name, equipment type, and operating system revision. Other types of information that may be collected from nodes along a network path include information about the health of a computer system and key performance indicators, such as CPU utilization and memory utilization. Additionally, system management requests may request the current contents of the flow cache on each of the systems of the path of a particular flow.

Protocol logic 206 may also be responsible for constructing network control protocol messages with system management request metadata. System management request metadata may be data initialized by originating node 202 and updated by nodes along a network path, such as intermediate nodes 212, 214 and destination node 216. A destination node, in this context, may implement operational logic providing the same functions as described herein for intermediate node 212, except that a node in a destination position does not forward or relay messages to other nodes. System management request metadata may include a node count indicating a quantity of nodes that have been traversed by the network control message, an application type identifier that uniquely identifies a type of an application sending the system management request from the originating node, a node identifier uniquely identifying the originating node, and a request identifier uniquely identifying the system management request. Additionally, system management request metadata may include a path identifier that uniquely identifies a path for routing the network control protocol message so that nodes that receive the network control protocol message may relay the message along a path specified by the originating node. For example, a path may be identified by a five-tuple including a destination IP address, a destination IP port, an IP protocol identifier, a source IP address and a source port.

Message sending logic 208 may be configured to send network control protocol messages that are configured by protocol logic 206 to contain system management requests, according to some embodiments. Message sending logic 206 may send network control protocol messages along a path already established within the network and specified by system management request metadata, as described above. Alternatively, network control protocol messages may be routed according to a path determined by the network control protocol itself. For example, if RSVP were used as the network control protocol, the path may be determined based on the routing protocols used to route RSVP Path and RESV messages.

Computer system 214 may be capable of processing system management requests sent in network control protocol messages. Computer system 214 may be an intermediate node along a network path, such as intermediate nodes 206, 208, or a destination node, such as destination node 210. Computer system 206 may be a system along a network path between originating node 202 and destination node 216 that is capable of processing system management requests sent in network control protocol packets, such as a router, hub, switch, personal computer or other computing device.

Computer system 214 may include message receiving logic 218, message protocol logic 220, management request processing logic 222, management agent 224, message relaying logic 226, message receiving logic 228, and message relaying logic 230. Relaying, in this context, may include adding response payloads to an originally received message, or initiating a new message, as further described herein. Message receiving logic 218 may receive outbound messages from originating node 202 to destination node 216 along a network path.

Message protocol logic 220 analyzes network control protocol messages received by message receiving logic 218 to determine if the received network control protocol messages contain system management requests. For example, message protocol logic 220 is configured to receive RSVP packets using RSVP as a transport, and to determine if the RSVP packets contain IAMP fields representing management requests and associated metadata.

The message protocol logic 220 may determine that a network control protocol message contains metadata that specifies that system management requests should be processed on an inbound path from destination node 216 to originating node 202. For example, system management request metadata may contain a flag specifying when system management requests should be processed. The flag may specify that the system management request should be performed when received on the outbound path from the originating node before reaching the destination node or on the inbound path from the destination node to the originating node. If the flag indicates outbound path processing, message protocol logic 220 may transmit the system management request to management request processing logic 222.

Alternatively, the flag may specify that the system management request should be processed on the inbound path from destination node 216 to originating node 202. If message protocol logic 220 determines that the system management request should be processed on the inbound path, message protocol logic may send the network control protocol message to message relaying logic 226 for forwarding to the destination node without sending the system management request to management request processing logic 222.

If the system management request is to be processed on the inbound path, the system management request may be processed once the network control protocol message is received at message receiving logic 228 from destination node 216. Message receiving logic 228 may receive a network control protocol message from destination node 216. Message protocol logic 220 may analyze the network control protocol message to determine if the network control protocol message includes a system management request. If a system management request is found, message protocol logic 220 may deliver the system management request to management request processing logic 222 for further processing.

It should be noted that if the node receiving the network control protocol message containing the system management request is a destination node, such as destination node 216, the system management request may be processed when received at the destination node, regardless of whether the request was set with flag to inbound or outbound processing. Depending on the mode, the destination node will simply send the response back, or it will in addition to the response also "reflect" back the request for processing as it traverses the nodes back towards the originator in inbound direction.

Message protocol logic 220 may receive response data from management request processing logic 222 for insertion into network control protocol messages to transmit the response data to originating node 202. Response data may be transmitted along the inbound path to the originating node from message relaying logic 230 on computer system 214. Response data may comprise data in IAMP messages. Response data also may be transmitted along the outbound path from message relaying logic 226 to destination node 216 before being transmitted to originating node 202 along the inbound path via receiving logic 228 and message relaying logic 230.

Moreover, message protocol logic 220 may be configured to send independent network control protocol messages for response data generated based on the system management request. Alternatively, message protocol logic 220 may be configured to add response data to an existing response message, such as an existing IAMP message, by concatenating or appending the response data generated at system 214 to response data generated by other nodes along the path between originating node 202 and destination node 216. Intermediate nodes may send several different forms of messages. An intermediate node may relay the message with the original request further along the same path towards the destination, so that the message reaches the next node on the path. In concatenated mode, the intermediate node may piggyback its own response data along with that message. In addition, the intermediate node may originate another message with response data and send that back towards the initiator. The response data can be the response of the intermediate node's own processing of the management request in individual response mode, or in concatenated response mode if the message payload would otherwise be too large.

Alternative methods for processing system management requests and transmitting system management response data are described further herein.

Management request processing logic 222 may perform system management requests received in network control protocol messages. For example, a system management request may contain a request to perform a particular system management function that may cause management request processing logic 222 to execute a system function on computer system 214, such as a system configuration function or a system state retrieval function. The system function may also be a system command to execute one or more applications, such as executing a command line utility or another software application available on computer system 214.

Management request processing logic 222 may also change the configuration of computer system 214 or collect information from computer system 214 in response to receiving a system management request. Alternatively, management request processing logic 222 may interact with another application running on computer system 214 via inter-process communication procedure calls. For example, management request processing logic 222 may communicate a system management request to management agent 224 running on computer system 214. Management agent 224 may perform the system management request and provide a response data back to management request processing logic 222 indicating the result of the system management request.

Management processing logic 222 may generate response data based on the performance of a system management request. Response data may indicate the success of the management request. For example, if a system management request includes a request to configure system 214, the response data may indicate the success or failure of the configuration request. Additionally, response data may include system data collected in response to a system management request, such as the name of the host system, the equipment type, operating system revision, health information, key performance indicators, or the current contents of a flow cache.

Intermediate node 212 may be a node on the network path between originating node 202 and destination node 210. Intermediate node 212 may be capable of processing management requests sent by originating node 202. Alternatively, intermediate node 212 may be a node that is not capable of processing system management requests. If intermediate node 212 cannot process management requests sent by originating node 202, intermediate node 212 may process or pass the message onward transparently or otherwise according to the network control protocol of the message. In one embodiment, intermediate node 212 may include no client layer of RSVP, such as no IAMP layer; in this case, there is no client intercepting the message and the node is "transparent". In another embodiment, intermediate node 212 has a client layer such as IAMP, but there is no application such as Mediatrace. In this case, the IAMP layer processes the message as normal, but instead of a response to a management request indicate that there is no client application on that node. In this case the intermediate node 212 is not transparent as the initiator node will know that there is an IAMP node along the way that did not deal with the targeted application. In another embodiment, an IAMP layer and application such as Mediatrace are in the intermediate node 212, but there is an internal processing error; for example, a management request or a request for video monitoring data returned an error. The intermediate node 212 processes this case as a regular response, which will contain an error code or error data.

Thus, an intermediate node that is not capable of processing a system management request may be traversed transparently.

Further, the originating node may be able to identify that there are nodes along the path that are not capable of processing a system management request based on the IP TTL included in the response payload. For example, if an intermediate node is not capable of processing a system management request, the originating node may not receive a response payload including the IP TTL for that intermediate node, and determines from receiving response payloads with gaps in their IP TTL values that the gaps represent non-capable nodes. The originating node may be able to determine based on the missing response payload and the IP TTL which node is not capable of processing system management requests.

Destination node 216 may implement logic similar to that described herein for intermediate node 212, except that a destination node does not forward or relay messages to further downstream nodes, so that elements 226, 228 are in applicable. In an embodiment, relaying logic 230, 226 may be implemented in the same logical unit and receiving logic 218, 228 may form the same logical unit. Thus multiple instances are not required, but are provided in FIG. 2 for purposes of clearly indicating data flows.

3.0 Example Path-Oriented Systems Management Approach

Figure 3:
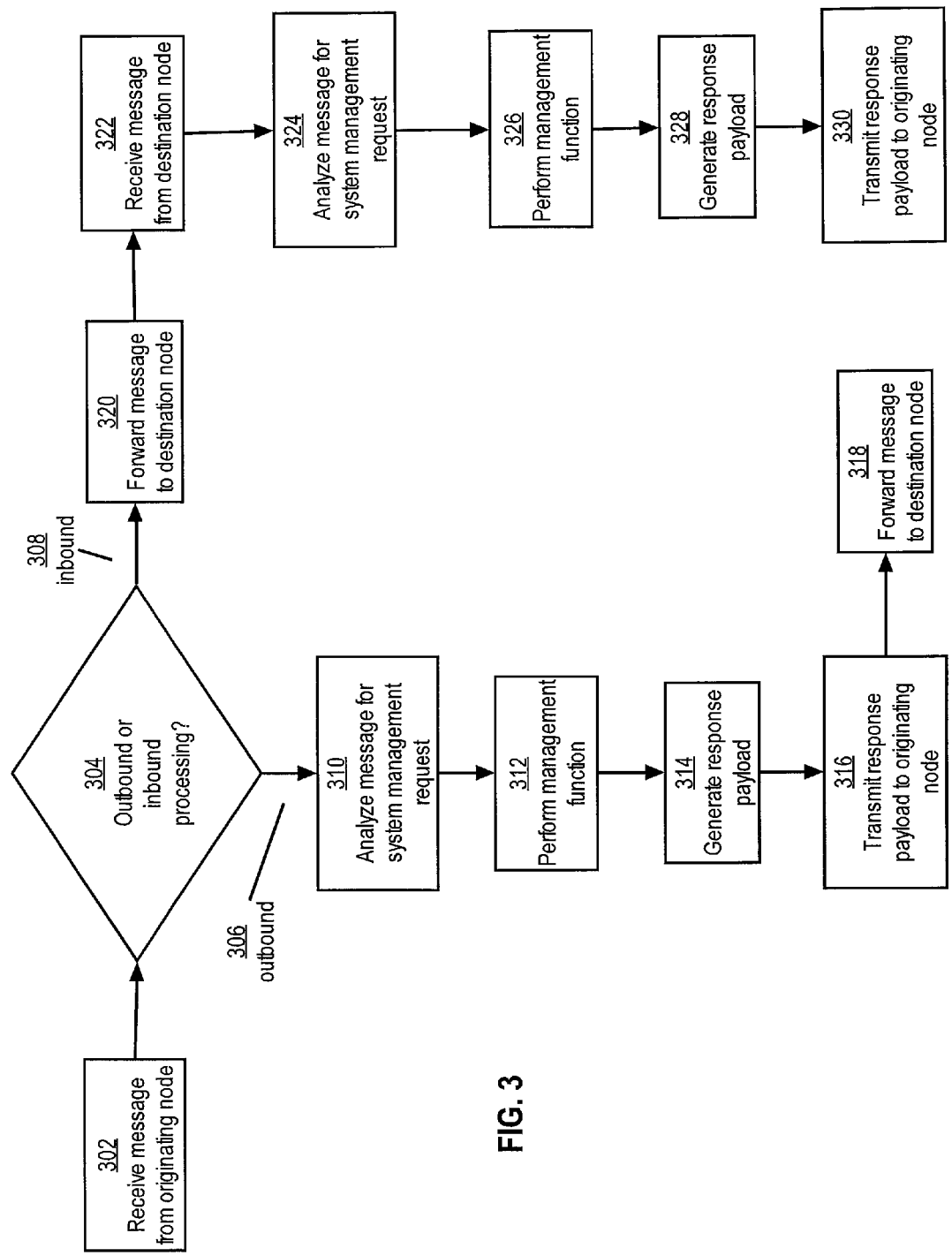
FIG. 3 illustrates an example process for path-oriented systems management.

FIG. 3 illustrates an example of path-oriented systems management. At step 302 a message is received from an originating node. For example, a network control protocol message, such as a RSVP, STUN or NLS message may be received from an originating node. The network control protocol message may be received by any node along a network path from the originating node to the destination node, including the destination node.

At step 304, the message may be analyzed to determine if there is a system management request and whether the system management request should be processed along the outbound path from the originating node or along the inbound path from the destination node to the originating node. For example, not all network control protocol messages will contain a system management request and network control protocol messages that do not have a system management request may be processed according to the particular protocol of the message, such as RSVP.

Network control protocol messages that contain a system management request may be processed further according to a flag contained within the system management request. The system management request may contain a flag that specifies whether the system management request should be processed along the inbound path or the outbound path, as described above. For example, a value in an RSVP flag field or IAMP field may indicate inbound or outbound processing. If the flag indicates outbound path processing, the process of FIG. 3 continues along outbound process flow 306. For example, if outbound path processing is indicated by the flag, the system management request is processed when it is received from the originating node and before the request is forwarded on to the destination node. If the flag indicates inbound path processing, the process of FIG. 3 continues along inbound process flow 308. For example, if inbound path processing is indicated by the flag, the system management request is not processed until the system management request is received from the destination node on the way back to the originating node.

Outbound process flow 306 illustrates outbound system management request processing, according to embodiments. At step 310, the network control protocol message received at step 302 may be analyzed to determine a system management request. For example, the network control protocol message may contain a system management request. The system management request may be one of many different system management requests that may be processed by computer systems along a network path from an originating node to a destination node. A system management request may be a request to perform system configuration functions, system data collection functions or any other system function for managing a computer system. At step 310, the system management request may be analyzed to determine which type of management request has been received. Except when concatenated responses are processed, step 310 may occur in parallel with step 318, as described below.

At step 312, the management function determined by step 310 may be performed. A management function received in a network control protocol message may be performed by the management request processing logic 222 of FIG. 2 or by a system management agent 224 running on a computer system. For example, a computer system may have various applications running on the system that perform system management tasks. The system management request may contain a command to execute an application or utility present on a computer system. Alternatively, the system management request may instruct management processing logic 222 to request that an application already running on the computer system, such as management agent 224, perform a system management function.

At step 314, a response payload is generated based on the performance of the management function specified in the system management request performed at step 312. For example, if the system management function is a system configuration function, a response payload may be generated indicating the success or failure of performing the system configuration function. For example, if the system administrator, or system management application, issuing the system configuration request does not have permission to configure a particular system along the network path a response payload indicating the failure of the request may be generated indicating that the system administrator, or system management application, does not have permission to configure the system. Alternatively, if the system management request is a request to perform a data collection function, a response payload containing the requested data may be generated.

At step 316, the response payload generated at step 314 may be transmitted to the originating node. For example, the response payload may be included in a network control protocol message associated with the same protocol as the network control protocol message received in step 302.

As a particular example, if RSVP is used to transport the system management request, the response payload may be transmitted in a RSVP Notify message or the response payload may be transmitted in a RSVP Reservation (RESV) message. Moreover, the response payload may be transmitted to the originating node in a new message generated for the purposes of sending the response payload, such as the RSVP Notify message above. Alternatively, the response payload may be concatenated, or appended, to an existing message, such as a RSVP RESV message, containing response payloads from other nodes along the network path between the originating node and the destination node. In some embodiments, the concatenated message may reach a size limit imposed on messages of certain protocols.

If a size limit is reached for a particular message, a new message may be generated for transmitting response payloads for nodes not yet reached on the network path. In an embodiment, a separate response message is generated for transmitting, to the initiator, response payloads that have been accumulated or concatenated. Such response payloads have the responses of systems that were already traversed; the original request message, without the stripped-off responses, is relayed further along the path towards the destination.

At step 318, the message received at step 302 is relayed to a destination node. For example, if the response payload is transmitted to the originating node by concatenating the response payload to the message received at step 302, once processing of the system management request is complete and the response payload is generated, the network control protocol message received at step 302 may be relayed to the destination node. Alternatively, if a new message is generated for sending the response payload to the originating node, the message may be relayed to the destination node anytime after the network control protocol message is analyzed to determine if it contains a system management request. Step 318 may be performed in parallel to step 310 when concatenated response processing is not used.

Inbound process flow 308 illustrates inbound system management request processing, according to embodiments. Inbound processing of a system management request may be done when the network control protocol message containing the system management request is transmitted from a destination node to the originating node.

At step 320, a network control protocol message received from an originating node may be relayed to a destination node. For example, the network control protocol message received at step 302 may contain a system management request that indicates inbound processing. Thus, instead of processing the system management request at step 320, step 320 relays the network control message without processing the system management request.

At step 322, the network control protocol message sent by the originating node is received from the destination node. For example, a RSVP message sent to the destination node may contain a system management request. The RSVP message may be transmitted along a network path to the destination node. Once the RSVP message reaches the destination node, the RSVP message may be sent back to the originating node along the network path. As the message traverses the path back to the originating node from the destination node, each computer system along the network path may receive the network control protocol message as indicated by step 322.

At step 324, the network control protocol message may be analyzed to determine the system management request. The processing at step 324 corresponds to the processing disclosed with respect to step 310.

At step 326, the management function indicated in the management request may be performed. The processing at step 326 corresponds to the processing disclosed with respect to step 312.

At step 328, a response payload may be generated based on the outcome of performing the management function described in step 326. The processing at step 328 corresponds to the processing disclosed with respect to step 214.

At step 330, the response payload generated at step 328 may be transmitted to the originating node. For example, the response payload may be concatenated or appended to the network control protocol message received at step 302, transmitted in a message generated for transmitting response payloads individually or concatenated to other response payloads generated at other nodes that are sent accumulated and sent in a single message, such as a RSVP Notify message or RSVP RESV message.

3.1 Path-Oriented System Management Messages

Figure 4B:
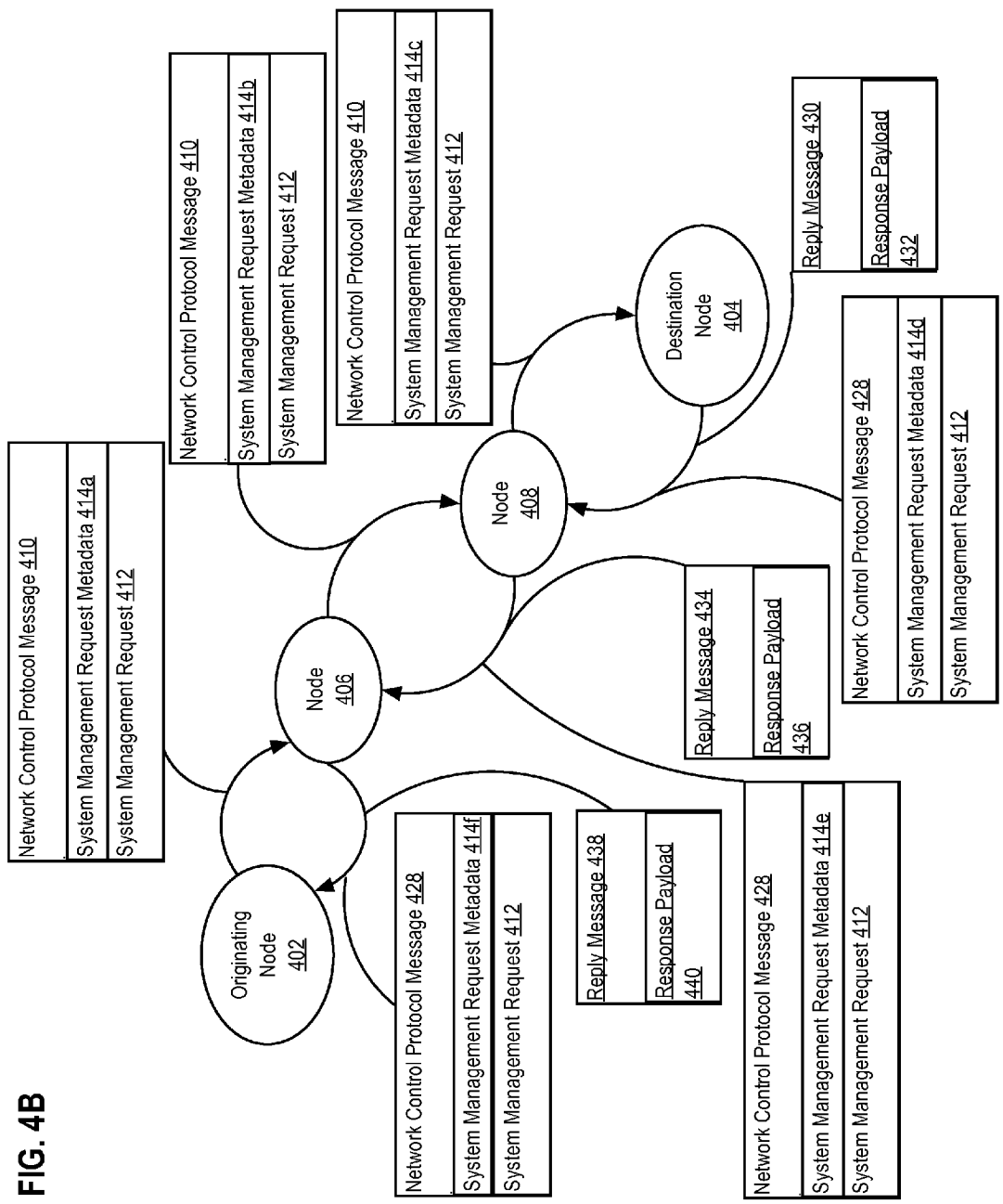
FIG. 4B illustrates management request processing along the inbound path with the response payload sent to the originating node in individual response messages according to embodiments.
Figure 4C:
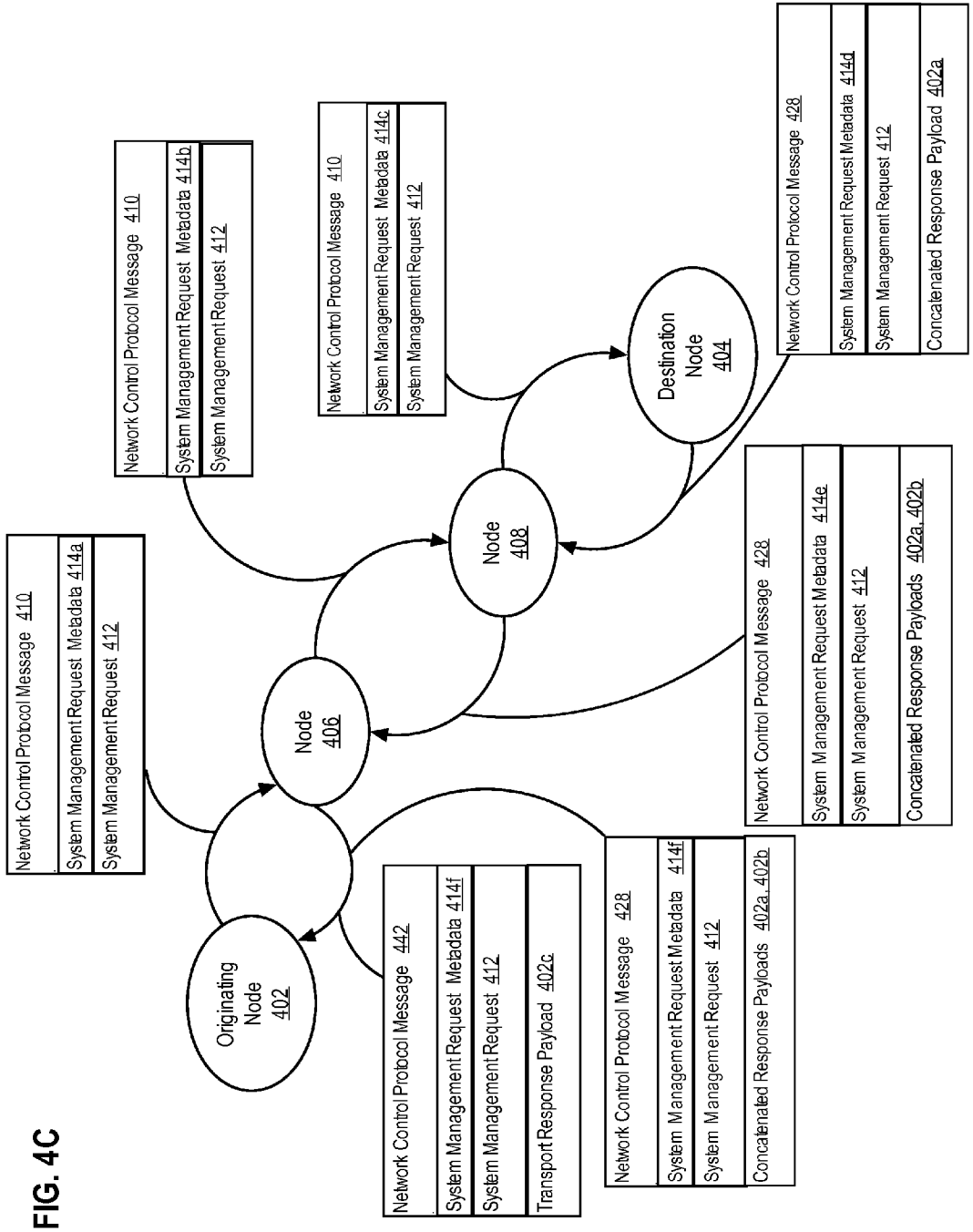
FIG. 4C illustrates management request processing along the outbound path with the response payload concatenated with other response payloads and sent to the originating node in a response message.

FIG. 4A illustrates management request processing along the outbound path with the response payload sent to the originating node in individual response messages according to embodiments. FIG. 4B illustrates management request processing along the inbound path with the response payload sent to the originating node in individual response messages according to embodiments. FIG. 4C illustrates management request processing along the outbound path with the response payload concatenated with other response payloads and sent to the originating node in a response message.

3.2 Outbound System Management Request Processing

Referring first to FIG. 4A, transmitting path-oriented systems management messages is illustrated according to an embodiment. System management requests contained in network control protocol messages, such as RSVP messages, may be processed at nodes along a network path between originating node 402 and destination node 404 as the messages are transmitted on the outbound path from originating node 402 to destination node 404. Nodes 404, 406, 408 may be nodes along the network path that are capable of processing systems management requests contained within network control protocol messages sent by originating node 402.

Originating node 402 may generate a network control protocol message 410 containing system management request 412 and system management request metadata 414. For example, network control protocol message 410 may be an RSVP Path message that has been extended to transport system management request 412 and system management request metadata 414 to nodes 404, 406, 408. System management request 412 may be any system management request such as a configuration request or data collection request.

The system management request 412 may be processed by all nodes along a network path that are capable of processing a system management request contained within the RSVP Path message. If a node along the network path between originating node 402 and destination node 404 is not capable of processing system management request 412 then the node may process the RSVP Path message according to RSVP and relay the message along to the next node without processing the system management request. Thus, a node not capable of processing the system management request is traversed transparently.

System management request metadata 414a contains data that allows originating node 402 to determine the characteristics of the path between originating node 402 and destination node 404. System management request metadata 414a also may allow originating node 402 to identify which response payload is associated with a particular node. For example, system management request metadata 414a may include a node count indicating a quantity of nodes (the number of hops) that have been traversed by the network control protocol message, an application identifier uniquely identifying the type of application making the system management request, a node identifier uniquely identifying the node which initiated the request and a request identifier uniquely identifying the system management request.

In an embodiment, metadata 414a may include information that indicates to the node how to process the message respectively to orchestrate the overall flow. For example, metadata 414a may specify whether to concatenate a response or send an individual response directly, and whether to process the request outbound or inbound.

Additionally, the system management request metadata 414a may include a flow identifier or path identifier to indicate to the underlying network control protocol implementation which flow path the network control protocol message should follow. For example, if the network control protocol message is a RSVP Path message, the path identifier may indicate to the RSVP implementation that the RSVP Path message containing the system management request should follow a particular path corresponding to the path identifier. If no path identifier is provided, the RSVP Path message may be sent along a path selected according to the RSVP.

As illustrated by FIG. 4A, message 410 may be received by node 406. Upon receipt of message 410, node 406 may process system management request 412 and generate reply message 416 containing response payload 418. For example, reply message 416 may be a network control protocol message of the same protocol as message 410. In an embodiment, reply message 416 may be a RSVP Notify message. For example, a RSVP Notify message may be extended to include response payload 418 indicating the outcome of processing system management request 412 at node 406.

For example, the response payload may contain information indicating the success or failure of the system management request or system data collected in response to the system management request. The response payload may also contain data to assist the originating node in identifying characteristics of the network path, such as which node sent the response payload. For example, the response payload may include a node count (a hop number) indicating a quantity of nodes that have been traversed by the network control protocol message. The hop number may indicate the position on the path of the node that is responding to the system management request relative to the originating node so that the originating node may reconstruct the sequence in which the nodes were traversed. The response payload may also include a node identifier that uniquely identifies the node sending the response and the IP Time to Live (TTL) of the request at the node sending the response. The IP TTL may be used to identify if any nodes were traversed that were not capable of processing the system management request. The response payload may also include a system management request identifier uniquely identifying the system management request, and the error response status generated by processing the request. The RSVP Notify message containing the response payload may then be transmitted to the originating node for further processing.

Additionally, after receiving network control protocol message 410, node 406 may update the system management request metadata before relaying message 410 toward destination node 404. For example, some of the response payload data, such as the hop number, may be copied from the system management request metadata. The hop number in the metadata may be updated, or incremented, by each node so that the hop number in the metadata may indicate how many hops have been traversed. Thus, system management request metadata 414a may be updated to system management request metadata 414b and 414c as it traverses nodes 406 and 408.

Similarly to the processing of system management request 412 at node 406, node 408 may process system management request 412 in response to node 406 relaying message 410 toward destination node 404. Thus, node 408 may generate reply message 420 containing response payload 422 in response to receiving system management request 412 in network control protocol message 410 on the outbound path from originating node 402 to destination node 404, according to embodiments. Node 404 may generate reply message 424 containing response payload 426 in a similar fashion.

3.3 Inbound System Management Request Processing

FIG. 4B illustrates transmitting path-oriented systems management messages according to an embodiment. Similarly to FIG. 4A, FIG. 4B illustrates a network path between originating node 402 and destination node 404 having intermediate nodes 406, 408. Originating node 402 may send a network control protocol message, such as a RSVP Path message, containing system management request 412 and system management request metadata 414a.

However, unlike the embodiment described with reference to FIG. 4A, system management request 412 may not be processed when received by node 406 on the outbound path from originating node 402 to destination node 404. For example, system management metadata 414a may contain a flag that indicates to node 406 that system management request 412 should be processed on the inbound path from destination node 404 to originating node 402 instead of on the outbound path from the originating node to the destination node. Accordingly, when node 406 receives network control protocol message 410 containing system management request 412, node 406 may relay message 410 along the network path toward destination node 404 without processing system management request 412. However, node 404 may update information contained within system management request metadata 414a, as described above.

Once network control protocol message 410 reaches destination node 404 a network control protocol message 428 is transmitted along the network path back to originating node 402. For example, if network control protocol message 410 is a RSVP message a RSVP RESV message may be generated and transmitted back to the originating node along the network path. The new RSVP RESV message may contain system management request 412 and system management request metadata 414d so that when the network control protocol message 428 is received by nodes 408, 406 these nodes may process the system management request and update the system management request metadata.

Upon receipt of network control protocol message 428 on the inbound path to originating node 402, node 408 may process system management request 412 and generate reply message 434 containing response payload 436. For example, if message 428 is a RSVP Path message containing system management request 412 and system management request metadata 414b, reply message 434 may be a RSVP Notify message or a RSVP RESV message configured to transport response payload 436. In some embodiments, reply message 434 may transport the response payload for a single node. For example, in FIG. 4B, nodes 404, 408, 406 each generate a corresponding reply message 430, 434, 438 that transport response payloads 432, 436, 440. In other embodiments, reply message 434 may transport the response payload for multiple nodes, as discussed further below with reference to FIG. 4C.

3.4 Concatenating Response Payloads

FIG. 4C illustrates transmitting path-oriented systems management messages according to an embodiment. FIG. 4C illustrates processing system management request along the inbound path from destination node 404 to originating node 402 and concatenating response payloads for transmission to the originating node. For example, network control protocol message 410 may be transmitted to destination node 404 from originating node 402. In an embodiment, network control protocol message 410 may be an RSVP message, a STUN message, a NLS message or any other path oriented system control protocol message. If network control protocol message 410 is a RSVP Path message, once the message reaches destination node 404, destination node 404 may generate a RSVP RESV message containing system management request 412 and system management request metadata 414d and transmit the RSVP RESV message back to originating node 402.

Additionally, destination node 404 may transmit response payload 402a in network control protocol message 428. For example, destination node 404 may process system management request 412 and generate response payload 402a based on the system management request as discussed above. However, instead of sending a separate message containing the response payload for destination node 404, such as a RSVP Notify message, the destination node may include response payload 402a in a RSVP RESV message containing system management request 412 and system management request metadata 414d and relay the RSVP RESV message to originating node 402.

When node 408 receives network control protocol message 428, the node may process system management request 412 and generate response payload 402b. However, instead of sending a separate message to originating node 402 containing response payload 402b, node 408 may concatenate response payload 402b to response payload 402a contained within network control protocol message 428 and relay network control protocol message 428 to originating node 402.

In some embodiments, concatenated response payloads 402a and 402b may reach a size limit imposed on messages of certain protocols. For example, a RSVP message length may be limited to 64K total size. If the size limit is reached then a new RSVP message may be generated to transport response payloads for nodes that have not yet processed the system management request. For example, network control protocol message 442 may contain system management request 412, system management request metadata 414f and concatenated response payloads 402a, 402b generated by nodes 404, 408. If network control protocol message has reached a size limit imposed by the network control protocol, or will exceed the size limit if additional response payloads are concatenated to response payloads 402a, 402b, a new network control protocol message 444 may be generated to transport response payload 402c for node 406 and the payloads in the new message are removed from the original message so that each message conforms to applicable size constraints. Thus, response payloads for additional nodes along the network path may be appended to response payload 402c contained within network control protocol message 444 but no additional response payloads may be appended to response payloads 402a and 402b contained within network control protocol message 442. Accordingly, concatenation of response payloads within network control protocol messages may provide a more efficient method of providing response data to the originating node because a new network control protocol message may not need to be generated and sent for each response payload.

Thus, an approach has been disclosed that allows a system in a network to direct a management request at all systems along the path toward another system. The management request traverses the network from the originator towards the destination of the request, following an IP flow down a path, and is intercepted and responded to by each system along the path that supports the techniques herein; systems that do not support the techniques are traversed transparently. Further, it is possible to discover that non-supporting and supporting systems exist in the path.

The approaches of this disclosure may allow a system administrator or a system management application to issue a single system management request which reaches all systems on a path instead of having to send a unique system management request to each system along a network path. In contrast, protocols such Common Open Policy Service Protocol (COPS) communicate policy information between Policy Decision Points (PDP) and Policy Enforcement Points (PEP) one at a time thereby requiring a message to be sent from a PDP to a PEP for each PEP on the network.

Moreover, embodiments may provide for autonomous systems management supported by the underlying network control protocol, such as RSVP, without help from an external management application. In contrast, protocols such as COPS-RSVP merely provide a mechanism to help setup and control the traffic over a path. In particular, COPS-RSVP requests are targeted at the path itself and the network traffic moving over the path rather than the systems that happen to be traversed by the path. Further, protocols such as RSVP-TE represent a specialization of RSVP used for traffic engineering (TE) that is used to signal resource reservations for traffic engineered tunnels rather than providing a systems management mechanism.

Embodiments disclosed herein may also negate the need to discover and pre-identify systems to which management requests should be directed before sending a management request to the systems. Further, the embodiments disclosed herein may provide an easy to support, decentralized systems management mechanism with the flexibility to support any type of system management request while retaining at each system the ability to restrict which requests are serviced.

Embodiments are useful, for example, to discover which systems currently lie along the path of a specific flow to find system information such as host name, equipment type, OS revision. Embodiments may be used to obtain health information or performance indicators of those systems on the path, such as CPU utilization or memory utilization. Embodiments may be used to obtain the current contents of a flow cache on each of the systems of a path of a particular flow.

4.0 Implementation Mechanisms—Hardware Overview

Figure 5:
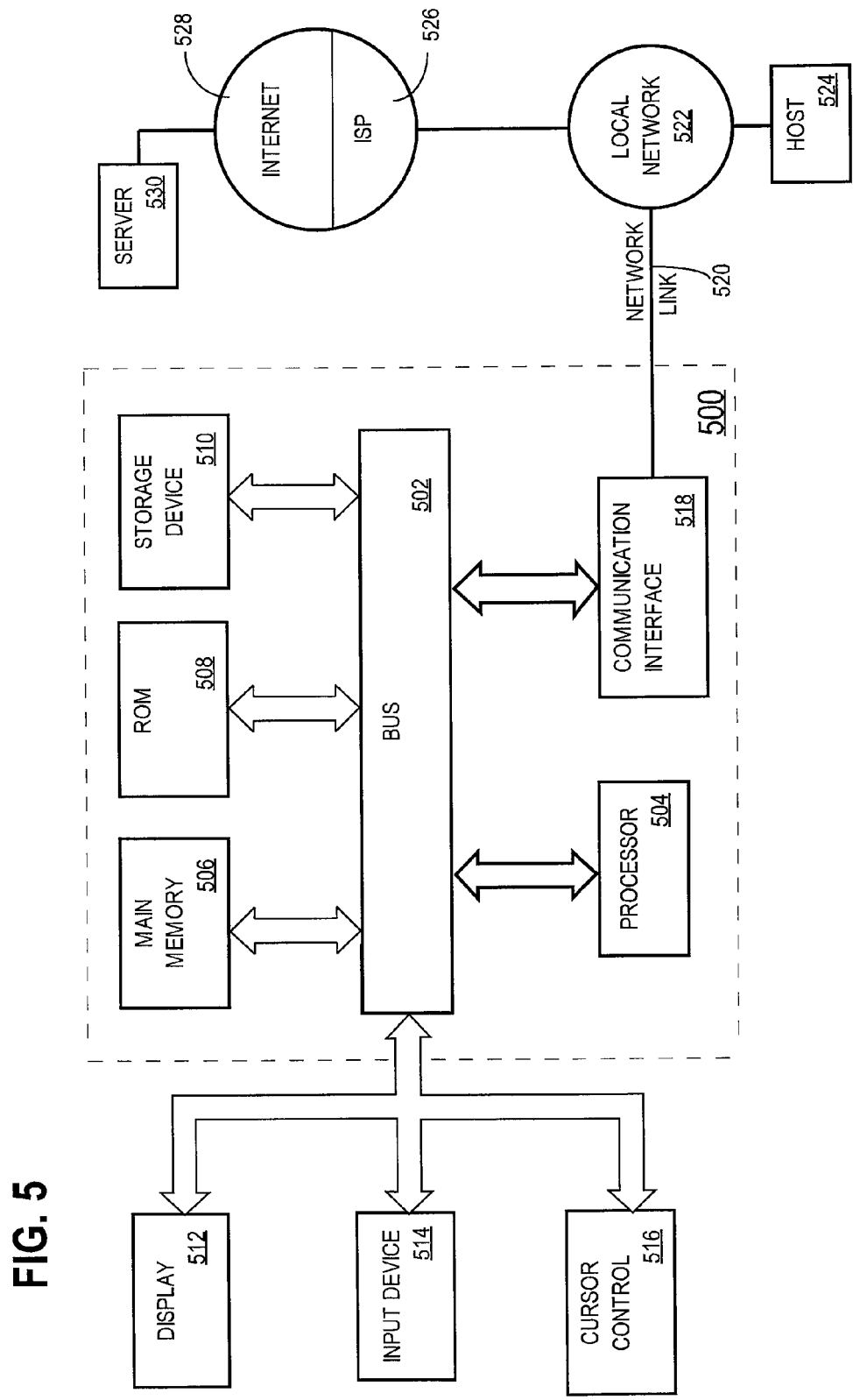
FIG. 5 illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
  receiving, at a first node, a network control message from an originating node, wherein the network control message was sent from the originating node on a specified path, wherein the network control message comprises a network control request and the network control message is received in one or more packets adhering to a path-oriented network control protocol;
  determining, at the first node, whether the network control message contains a system management request, wherein the system management request is distinct from the network control request;
  in response to determining that the network control message contains the system management request:
    analyzing the system management request to determine a particular system management function to perform at the first node;
    in response to determining the particular system management function to perform at the first node, performing the particular system management function; and
    generating a response payload indicating a result generated by performing the particular system management function;
  relaying the network control message to a second node along the specified path using a second one or more packets adhering to the path-oriented network control protocol;
  wherein the method is performed by one or more processors.

2. The method of claim 1, wherein the response payload is transmitted to the originating node using the path-oriented network control protocol.

3. The method of claim 1, wherein the network control message was sent from the originating node on the specified path and without specifying a destination node.

4. The method of claim 2, further comprising receiving the network control message from a destination node and relaying the network control message to the originating node using the path-oriented network control protocol, wherein the performing and the generating are performed in response to receiving the system management request from the destination node, and after the system management request has been communicated from the originating node to the destination node.

5. The method of claim 2, further comprising:
  concatenating the response payload to one or more other response payloads from one or more other nodes and transmitting a concatenated response payload using the path-oriented network control protocol.

6. The method of claim 1, wherein the network control message contains system management request metadata that comprises a node count indicating a quantity of nodes that have been traversed by the network control message; an application type identifier uniquely identifying a type of an application or client to which the request is directed; a node identifier uniquely identifying the originating node; a request identifier uniquely identifying the system management request.

7. The method of claim 1, wherein the network control message contains system management request metadata that comprises a path identifier uniquely identifying a path for routing the network control message; wherein relaying the network control message to the second node comprises relaying the network control message along the path identified by the path identifier.

8. The method of claim 1, wherein the response payload comprises a node count indicating a quantity of nodes that have been traversed by the network control message; a node identifier uniquely identifying the first node; an IP TTL of the network control message at the first node; a request identifier uniquely identifying the system management request; an error response status generated by processing the system management request.

9. The method of claim 1, wherein the network control message is one of a resource reservation protocol (RSVP) message, a simple traversal of user datagram protocol through network address translators (STUN) message, or a network layer signaling (NLS) message.

10. The method of claim 1, wherein the particular management function comprises one of a system configuration function, a system state retrieval function, a system command to execute one or more applications on the first node, and an invocation of a function provided by an application executing on the first node.

11. The method of claim 1, wherein the network control request causes a configuration function to be performed at the first node and the particular system management function is distinct from the configuration function.

12. A non-transitory computer-readable storage medium storing one or more sequences of instructions that, when executed on one or more processors, causes the processors to perform a method comprising:
  receiving, at a first node, a network control message from an originating node, wherein the network control message was sent from the originating node on a specified path, wherein the network control message comprises a network control request and the network control message is received in one or more packets adhering to a path-oriented network control protocol;
  determining, at the first node, whether the network control message contains a system management request, wherein the system management request is distinct from the network control request;
  in response to determining that the network control message contains the system management request:
    analyzing the system management request to determine a particular system management function to perform at the first node;

in response to determining the particular system management function to perform at the first node, performing the particular system management function, and generating a response payload indicating a result generated by performing the particular system management function;

relaying the network control message to a second node along the specified path using a second one or more packets adhering to the path-oriented network control protocol.

13. The non-transitory computer-readable storage medium of claim 12, wherein the response payload is transmitted to the originated node using the path-oriented network control protocol.

14. The non-transitory computer-readable storage medium of claim 13, the network control message was sent from the originating node on the specified path and without specifying a destination node.

15. The non-transitory computer-readable storage medium of claim 13, storing one or more sequences of instructions that causes the processors to perform the method further comprising:

receiving the network control message from a destination node;

relaying the network control message to the originating node using the path-oriented network control protocol;

wherein the performing and the generating are performed in response to receiving the system management request from the destination node, and after the system management request has been communicated from the originating node to the destination node.

16. The non-transitory computer-readable storage medium of claim 13, storing one or more sequences of instructions that causes the processors to perform the method further comprising: concatenating the response payload to one or more other response payloads from one or more other nodes and transmitting a concatenated response payload using the path-oriented network control protocol.

17. The non-transitory computer-readable storage medium of claim 12, wherein the network control message contains system management request metadata that comprises a node count indicating a quantity of nodes that have been traversed by the network control message; an application type identifier uniquely identifying a type of an application or client to which the request is directed; a node identifier uniquely identifying the originating node; a request identifier uniquely identifying the system management request.

18. The non-transitory computer-readable storage medium of claim 12, wherein the network control message contains system management request metadata that comprises a path identifier uniquely identifying a path for routing the network control message; wherein relaying the network control message to the second node comprises relaying the network control message along the path identified by the path identifier.

19. The non-transitory computer-readable storage medium of claim 12, wherein the response payload comprises a node count indicating a quantity of nodes that have been traversed by the network control message; a node identifier uniquely identifying the first node; an IP TTL of the network control message at the first node; a request identifier uniquely identifying the system management request; an error response status generated by processing the system management request.

20. The non-transitory computer-readable storage medium of claim 12, wherein the network control message is one of a resource reservation protocol (RSVP) message, a simple traversal of user datagram protocol through network address translators (STUN) message, or a network layer signaling (NLS) message.

21. The non-transitory computer-readable storage medium of claim 12, wherein the particular management function comprises one of a system configuration function, a system state retrieval function, a system command to execute one or more applications on the first node, and an invocation of a function provided by an application executing on the first node.

22. The non-transitory computer-readable storage medium of claim 12, wherein the network control request causes a configuration function to be performed at the first node and the particular system management function is distinct from the configuration function.

23. An apparatus comprising:
one or more processors;
message receiving logic coupled to the one or more processors and configured to obtain a network control message from an originating node, wherein the network control message was sent from the originating node on a specified path, wherein the network control message comprises a network control request and the network control message is received in one or more packets adhering to a path-oriented network control protocol;
message protocol logic configured to determine whether the network control message contains a system management request, and in response to determining that the network control message contains the system management request analyze the system management request to determine a particular system management function to perform, wherein the network control request is distinct from the system management request;
system management request processing logic configured to, in response to the message protocol logic determining the particular system management function to perform, perform the particular system management function and generate a response payload indicating a result generated by performing the particular system management function;
first message relaying logic configured to relay the network control message to another node along the specified path using the path-oriented network control protocol.

24. The apparatus of claim 23, further comprising second message relaying logic is configured to transmit the response payload to the originating node using the path-oriented network control protocol.

25. The apparatus of claim 23, wherein the network control request causes a configuration function to be performed at the apparatus and the particular system management function is distinct from the configuration function.

* * * * *